A. BURKHOLDER.
BABY WALKER.
No. 11,140. Reissued Jan. 20, 1891.
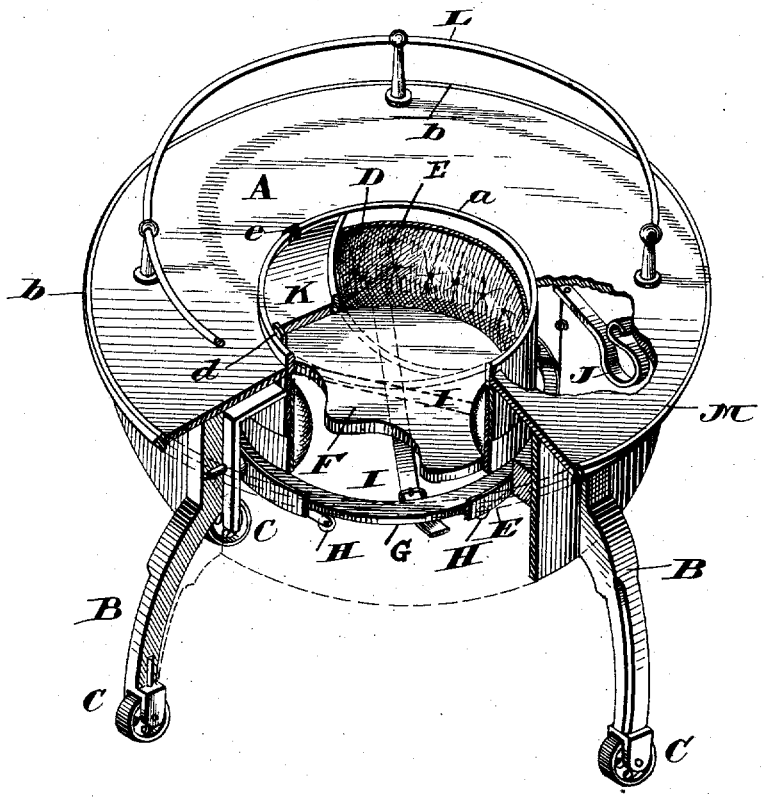
WITNESSES
Franck L. Durand.
Chas E. Riordon.
INVENTOR
Alfred Burkholder.
By Chas. H. Riches Attorney.
THE NORRIS PETERS CO., PHOTO-LITHO., WASHINGTON, D. C.

UNITED STATES PATENT OFFICE.

ALFRED BURKHOLDER, OF TORONTO, CANADA.

BABY-WALKER.

SPECIFICATION forming part of Reissued Letters Patent No. 11,140, dated January 20, 1891.

Original No. 428,452, dated May 20, 1890. Application for reissue filed November 24, 1890. Serial No. 372,525.

*To all whom it may concern:*

Be it known that I, ALFRED BURKHOLDER, of Toronto, in the county of York and Province of Ontario, Canada, have invented certain new and useful Improvements in a Combined Baby-Walker and Baby-Jumper; and I do hereby declare the following is a full, clear, and exact description of the invention, that will enable others skilled in the art to which it appertains to make and use the same, reference being had to the accompanying drawings, and to the letters of reference marked thereon, which form a part of this specification.

The object of the invention is to devise a combined baby-walker and baby-jumper; and the invention consists in the novel construction and combination of parts hereinafter described, and specifically pointed out in the claims.

The device, as shown, comprises a table supported on suitable legs provided with casters, a circular hole being made in the center of the table to admit the body of a child. A padded ring is suspended within and below the hole by springs secured to the under side of the table, and near the bottom of the padded ring is a supplemental ring supported on friction-rollers. This supplemental ring is provided with a detachable seat and with straps arranged to extend between the legs of the baby to support it while walking after removal of the detachable seat, the whole being constructed as hereinafter more particularly explained.

The drawing is a perspective view, partially in section, of a combined baby-jumper and baby-walker embracing my invention.

Like letters of reference refer to like parts throughout the specification and drawing.

In the drawing, A represents a table, which I preferably make round and sufficiently large to carry toys and other articles. This table is supported by the legs B, on the ends of which large caster-wheels C are placed, so that the table may be pushed freely on the floor.

D is a hole made in the center of the table A, while *a* represents a bead formed on the table surrounding the hole D, and *b* is a bead surrounding the outer edge of the table A, so as to prevent toys and other articles placed on the table from rolling off.

E is a padded ring placed within and immediately below the hole D. Within this ring is provided a detachable seat F, extending about half-way across the padded ring E, so that the legs of the child seated upon the seat may extend through the ring. This seat F may be held in position in any suitable manner, provided the means adopted for such purpose will permit it to revolve and to be readily detached.

G is a supplemental ring placed near the bottom of the ring E, and resting upon friction-rollers H (shown as carried by the ring E) in such a manner that the said ring G may be revolved easily within the ring E. The straps I are connected to the ring G in such a manner that they may be readily detached. The ring E is supported in position by the springs J in such a manner that any weight placed on the seat F will cause a free spring movement of the padded ring E, the seat F, and the supplemental ring G.

I do not wish to confine myself to any particular form of spring nor to any particular way of holding the seat F in position.

K is a shelf hinged at *d*, and provided with hooked supports *e*, placed at or near each end of the shelf, and designed to rest upon the bead *a*. This hinged shelf provides a convenient support for the toys of a small child occupying the seat F, and it may be readily raised out of the hole D when the seat F is removed, and the device is used as a support for a child learning to walk.

When my device is to be used as a support for a child learning to walk, the seat F is removed and the legs of the child are placed between the straps I. A rod L is connected to the table A inside of its outer rim, so that the child may readily grasp the said rod without any fear of knocking its fingers against the wall or other obstruction against which it may push the table.

With the view of protecting the outer rim of the table A, I insert a rubber ring M in a channel formed in the outer edge of the table.

From this description it will be seen that I provide not only a baby-jumper suitable for a small child, but I also combine with the said baby-jumper the advantages of a suitable support for assisting a child while learning to walk.

By making the supplemental ring G revoluble and connecting the supporting-straps I to it, the child learning to walk may turn in any direction without the slightest exertion and without the necessity of revolving the entire table. Consequently the child is taught to walk practically without any exertion.

What I claim as my invention is—

1. A table supported on suitable legs provided with caster-wheels and having a hole made in its center to receive a child, in combination with a spring-supported ring located in said hole, a revoluble supplemental ring to which supporting-straps are connected, and friction-rollers H between said rings, substantially as set forth.

2. A table A, provided with legs B, having caster-wheels C placed on their feet, a bead *a*, formed on the table A and surrounding the hole made in its center, and a bead *b*, surrounding the outer rim of the table A, a shelf K, hinged at *d* to the table A and provided with hooked supports *e*, in combination with an elastically-supported padded ring E and supplemental ring G, supported on friction-rollers H and carrying the straps I, the whole being arranged substantially as and for the purpose specified.

3. In a combined baby-walker and baby-jumper, the combination, with a table A, suitably supported and having a hole therein to receive a child, of an elastically-supported ring E, located in said hole, a revoluble supplemental ring G, carried by the ring E, and a suitable seat F, supported on the revoluble ring G, substantially as set forth.

4. In a baby-walker, the combination, with the table A, suitably supported and having a hole therein to receive a child, of an elastically-supported revoluble ring G and a suitable seat F, carried by said ring, whereby the child is enabled to easily turn its spring-supported seat without turning the table, as set forth.

5. In a baby-walker, the combination, with the table A, suitably supported and having a hole therein to receive a child, of an elastically-supported ring E, located in said hole, and a suitable seat F, supported beneath the lower edge or rim of the ring E, substantially as and for the purpose described.

6. In a combined baby-walker and baby-jumper, the combination, with the table A, having therein a hole to receive a child, of the elastically-supported ring E, located within said hole, and the hinged shelf or leaf K, located within the ring E, as shown and described.

7. The combination, with the table, of an elastically-supported and revoluble ring provided with the supporting-straps, substantially as and for the purpose described.

In testimony whereof I affix my signature in the presence of two witnesses.

ALFRED BURKHOLDER.

Witnesses:
GUSTAVE A. PRIEST,
GEORGE E. LUCAS.